United States Patent
Netz

(10) Patent No.: US 7,834,487 B2
(45) Date of Patent: Nov. 16, 2010

(54) SHORTING STICK FOR SAFING OF HIGH-VOLTAGE EQUIPMENT

(76) Inventor: Dana A. Netz, P.O. Box 286, Jemez Springs, NM (US) 87025

( * ) Notice: Subject to any disclaimer, the term of this patent is extended or adjusted under 35 U.S.C. 154(b) by 248 days.

(21) Appl. No.: 12/231,926

(22) Filed: Sep. 8, 2008

(65) Prior Publication Data

US 2010/0060085 A1 Mar. 11, 2010

(51) Int. Cl.
*H02H 11/00* (2006.01)
*H05F 3/00* (2006.01)

(52) U.S. Cl. ........................ 307/326; 361/222

(58) Field of Classification Search ............ 307/326; 361/54, 55, 222
See application file for complete search history.

(56) References Cited

U.S. PATENT DOCUMENTS

| | | | |
|---|---|---|---|
| 1,797,346 A | 3/1931 | Johnson | |
| 1,940,491 A | 12/1933 | Freitag | |
| 2,316,204 A * | 4/1943 | Williams | 81/53.1 |
| 2,508,778 A | 5/1950 | Spears | |
| 2,541,788 A | 2/1951 | Stover | |
| 3,017,905 A | 1/1962 | Klein | |
| 3,392,334 A * | 7/1968 | Bevins | 324/149 |
| 3,624,592 A * | 11/1971 | Walter | 439/477 |
| 3,788,691 A | 1/1974 | McMullin | |
| 3,868,136 A | 2/1975 | Schweitzer, Jr. | |
| 4,230,357 A | 10/1980 | Bosch et al. | |
| 5,096,438 A | 3/1992 | Black | |
| 6,453,776 B1 | 9/2002 | Beattie et al. | |
| 6,941,841 B2 | 9/2005 | Johnson et al. | |
| 6,943,301 B2 | 9/2005 | Lee | |
| 7,156,354 B2 | 1/2007 | Shepherd et al. | |
| 2003/0015330 A1 | 1/2003 | Wood et al. | |

* cited by examiner

*Primary Examiner*—Jared J Fureman
*Assistant Examiner*—Hal I Kaplan
(74) *Attorney, Agent, or Firm*—Rod D. Baker

(57) ABSTRACT

An electrical shorting stick and method of using it. The apparatus and method allow the user to work on or about high-voltage equipment at tremendously reduced risk of accidental electrocution. The apparatus permits the user to secure a reliable short-circuit of the equipment to the absolute ground, so that current cannot be directed through the bodies of the service crew. The apparatus is placed into contact with the equipment of interest. While in contact with the equipment, the apparatus is manipulated by the user to safely discharge to absolute ground all potentially hazardous electrical current. The apparatus has a handle assembly movable upon a main road assembly. When the handle assembly is placed into a first position, current is directed from the equipment to the absolute ground via the apparatus including a resistor. The handle assembly is shifted to a second position, in which current is directed through the apparatus, but bypassing the resistor, in a conductive circuit directly to absolute ground, thus providing a safe "hard" grounding of the equipment of interest.

17 Claims, 5 Drawing Sheets

SHORTING STICK FOR SAFING OF HIGH-VOLTAGE EQUIPMENT

BACKGROUND OF THE INVENTION

1. Field of the Invention (Technical Field)

The present invention relates to a safety apparatus and a method for "safing" high-voltage devices during maintenance and repair; more specifically, this disclosure relates to an improved shorting stick whereby electrical equipment can be rendered safe against electrocution.

2. Background Art

High voltage devices such as capacitors and cables must be discharged of energy before they may be safely handled. For low-energy components, a simple shorting stick fashioned from a non-conductive handle connected to a grounded hook or bolt may be used.

If a person were to touch a grounded stick to a higher-energy component, a dangerous arc could be generated. To mitigate this hazard, simple known shorting sticks have a current-limiting resistor mounted on a non-conductive handle. The worker first contacts the resistively-grounded lug to the high voltage device to discharge any remaining energy and then, after a moment, touches the grounded lug to the high voltage device. The shorting bar is left in place or a grounding clip is connected to the component to ensure that it remains shorted.

The problem with existing designs of shorting sticks is that the stick must be lifted off the resistive lug and moved to access the shorted lug. The resistor is mounted off-axis and is covered by a sheath which makes it unwieldy when held at a distance. The resistive lug is mounted at the end of the stick and the shorted lug at the opposite end of the resistor, toward the user. This means that the user must move the stick the length of the resistor into the internals of whatever the component is mounted within, often other high-voltage components.

BRIEF SUMMARY OF THE INVENTION

There is disclosed an apparatus and method for protecting a user from hazardous high voltage, or more particularly high-amperage electrical current, from an electrical equipment or component to be serviced, or nearby which labors are to be performed. The "shorting stick" apparatus is placed into contact with the equipment of interest. While in contact with the equipment, the apparatus is manipulated by the user to safely discharge to absolute ground all potentially hazardous current. The apparatus has a handle assembly movable upon a main road assembly. When the handle assembly is placed into a first position, current is directed from the equipment to the absolute ground via the apparatus including a resistor. The handle assembly is shifted to a second position, in which current is directed through the apparatus, but bypassing the resistor, in a conductive circuit directly to absolute ground, thus providing a safe "hard" grounding of the equipment of interest.

A primary object of the present invention is to provide a shorting stick apparatus that is simply and affordably constructed.

Another object of the present invention is to provide shorting stick apparatus and method that are easy to use without compromising reliability.

A primary object of the present invention is to provide increased safety through simplicity of use.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIG. 2A is a perspective view of an alternative version of the collar component of the apparatus seen in FIG. 2;

Like components are assigned like reference numerals throughout the several views.

DETAILED DESCRIPTION OF THE INVENTION

There is disclosed hereby an apparatus and method for reducing, easily and reliably, the hazard of electrocution when an individual worker or a crew is working on or about high-voltage equipment. The apparatus features a hand-held, hollow, cylindrical resistor constructed from carbon ceramic. Being hollow, the cylinder is mounted axially on a non-conductive stick. At either end of the resistor, conductive mounting elements are provided for connection to and support on the stick. These mounting elements also have washers or other contact points that make contact with a collar that slides along the outside of the resistor. The collar is connected to a grounding strap and is controlled by the user via a non-conductive handle which is slidable over the stick. In this disclosure, "conductive" means that a component or composition readily transmits electrical energy. "Non-conductive" means that the component or composition is substantially an electrical insulator.

To practice the method, described very generally, the user pulls the collar fully back. The distal end of the stick is placed on the high voltage component or device of concern, and the energy is discharged from the device, through distal mounting elements, through the resistor to proximate mounting elements, then through the sliding collar to ground. Then, without moving the stick, the user slides the handle forward, pushing the collar to the forward connection and applying a hard ground to the device of concern. The stick apparatus may accommodate a twist-locking feature to hold the grounded collar against the forward connector, so that the stick could be left in place while work is performed on the discharged component.

Figure 1:
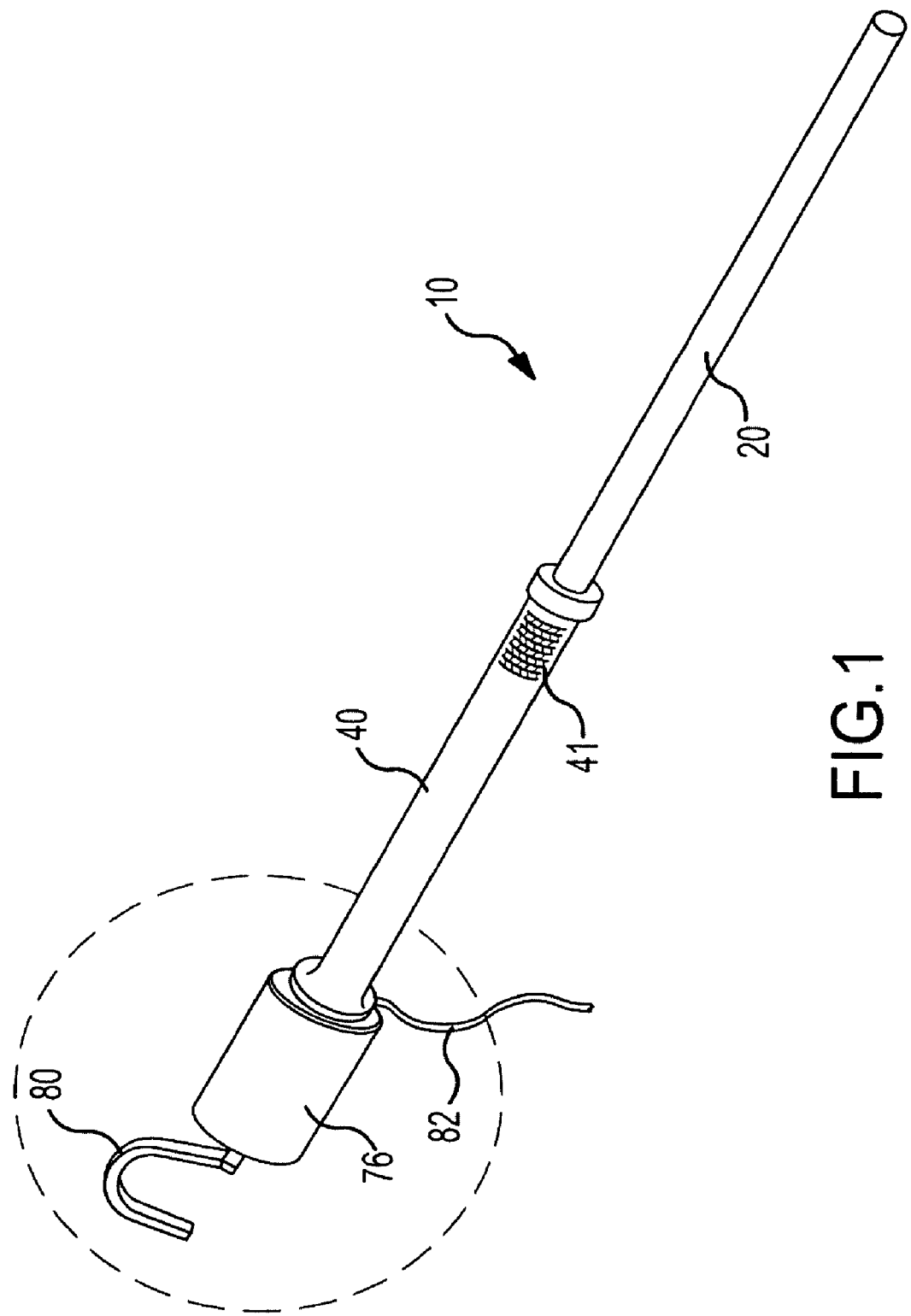
FIG. 1 is a perspective view of an assembled shorting stick apparatus according to one embodiment of the present disclosure.

Regarded overall, the shorting stick apparatus 10 has two main assemblies: a main rod assembly and a sliding handle assembly. FIG. 1 shows portions of each of these two assemblies, and offers relative orientations for them. The main rod assembly principally includes an elongated rod 20 that is preferably but not necessarily cylindrical. Mounted on the distal end of the rod 20 is a shorting base assembly, most of which is not seen in FIG. 1, but which shall be described further. The full axial extent of the rod 20 may be from about thirty inches (76 cm) to about forty inches (102 cm), but these dimensions are by way only of example. The rod 20 is configured with a cross sectional-shape and size to be easily and securely grasped in one hand, so may have an outside diameter of, for example, approximately 1½ inches (3.8 cm). The rod 20 is fabricated from a strong, rigid, electrically non-conductive material, such as dry wood, insulating phenolic substances, non-conductive polymer composites, or the like. Seen in FIG. 1 are two elements of the shorting base assembly attached to the rod 20, namely the equipment contact member 80 and the optional but preferable debris barrier 76, both to be further described.

FIG. 1 also illustrates a portion of the sliding handle assembly, which is mounted coaxially around the main rod assembly and is slidable axially thereupon. The sliding handle assembly includes a rigid, tubular handle 40 crafted from a non-conductive material such as a plastic. The handle 40 has an inside diameter just slightly greater than the outside diameter of the rod 20, and is adapted to slide smoothly yet snugly along a segment of the rod 20 with minimal radial lateral movement. The handle 40 has an overall axial length significantly shorter than the rod 20. The proximate portion of the handle 40 optionally features a grip portion 41 to enhance the frictional grip of the user's hand.

Before disclosing further the apparatus 10, a general description of a method for using it is now offered to provide additional context. To practice the invention, the user grasps the rod 20 in one hand, and the grips the handle 40 (e.g., at the grip portion 41) in the other hand. The handle 40 is drawn toward the user until a certain physical and electrical contact is made between the sliding handle assembly and the main rod assembly, which stops further proximal axial movement of the handle 40. The user then cautiously places the distal equipment contact member 80 into physical and electrical contact with the high voltage device of interest. Electrical energy is directed through resistive elements of the apparatus 10 in a manner to be further described, discharging electrical energy harmlessly to ground. While using the rod 20 to maintain contact between the contact member 80 and the device of interest, the user slides the handle 40 distally, i.e., away from the user and toward the contact member 80, until a certain second and distinct physical and electrical contact is made between the sliding handle assembly and the main rod assembly, which stops further axial movement of the handle 40. This second electrical contact position allows a low-resistance electrical discharge from the device of interest and safely through the apparatus 10 to supply a "hard" ground for the device. The apparatus 10 may then be left in place in contact with the device of interest to allow the device to be worked upon safely.

Figure 2:
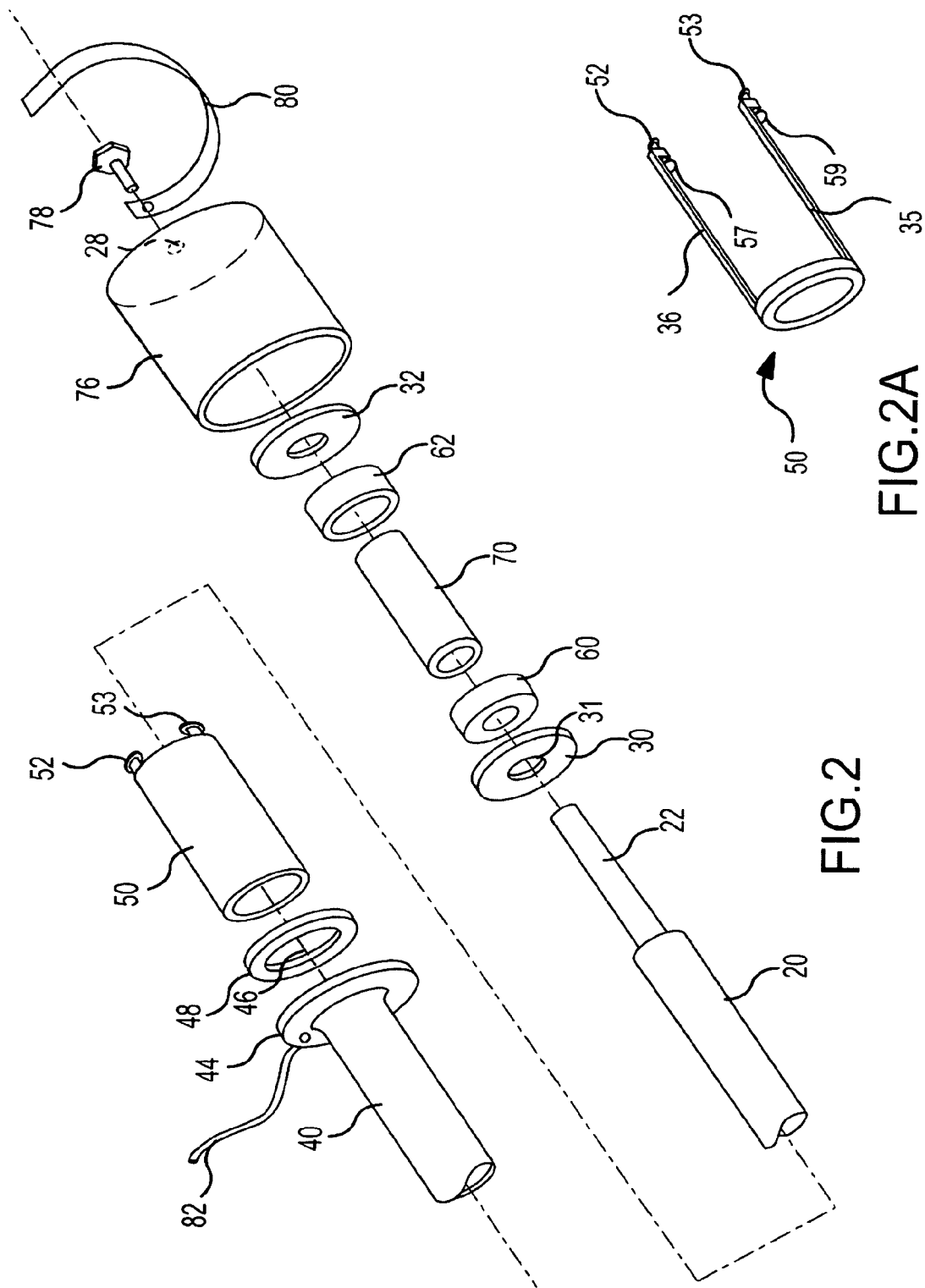
FIG. 2 is an exploded view the apparatus depicted in FIG. 1, illustrating many of the principal components thereof (only segment portions of the handle and main rod components are depicted)

Attention is invited to FIG. 2, which provides an exploded view of principal components of the shorting sick apparatus 10. The main rod assembly has as its foundation the rod 20 which has extending distally there from an elongated mounting shaft 22. (Only the distal end of the rod 20 is seen in the partial or break-away view of FIG. 2.) The mounting shaft portion 22 preferably is integrally formed with the main rod 20 and is made of the same non-nonconductive material. The mounting shaft 22 has a reduced diameter relative to the main rod 20.

The main rod assembly also includes an electrically conductive first mounting washer 30. The first mounting washer 30 has a central aperture 31 with a diameter slightly greater than the diameter of the mounting shaft 22 so that the first mounting washer 30 can be slipped over and along the mounting shaft until the washer 30 contacts the larger diameter main rod 20. There also is featured a second mounting washer 32 that preferably is substantially identical in size, form and composition to the first mounting washer 30. The mounting washers 30, 32 may be relatively thin, and conventionally manufactured from high-copper content brass, for preferable example. The main rod assembly also has a pair of resistor clamps 60, 62. The resistor clamps 60, 62 preferably (but not necessarily) are substantially identical to each other. The resistor clamps 60 and 62 may be cylindrical screw-actuated clamps as generally depicted in FIG. 2. Alternatively, other clamping or mounting components known in the art, adapted to securely engage and hold an end of a cylindrical resistor 70, may be employed. The function of the resistor clamps 60, 62, whatever their selected configuration or mode of operation, is to securely but preferably releasably hold the resistor 70 in, preferably, a substantially coaxial position around the mounting shaft 22 when the apparatus 10 is fully assembled. The first and second resistor clamps 60 and 62 are electrically conductive, and may be fabricated from, for example, a high-copper brass.

The resistor 70 is a hollow, preferably rigid, cylinder. The resistor 70 is fabricated from, for example, a carborundum compound or other ceramic material. Other materials may also be employed by persons skilled in the art to fabricate a suitable resistor, depending upon the desired duty level of the apparatus 10. The resistor 70 has an inside diameter larger than the diameter of the mounting shaft 22, to that the resistor can be placed in a position coaxially surrounding the shaft but spaced apart from it to define a gap between the shaft 22 and the resistor. The resistor 70 has an overall length slightly shorter than the length of the mounting shaft 22.

Very preferably, a non-conductive shrapnel barrier or debris shield 76 is included in the main rod handle assembly. The debris shield is a hollow cylinder preferably composed of a high-strength, shatter-resistant acrylic. The shield 76 is a safety feature. In the event a malfunction or component breakage of some type results in an explosive failure of the resistor 70 or other elements of the apparatus in the vicinity of the resistor, the debris shield contains flying debris to prevent injury therefrom to the operator. The debris shield is connected securely upon the distal end of the mounting shaft 22 of the main rod 20.

Mounted upon the distal end of the mounting shaft 22 is the equipment contact member 80. The contact member is a conductive element fabricated from, for example, copper. The contact member 80 may have the shape of a curved hook, for example and as seen in FIG. 2. Alternatively, the contact member 80 may be otherwise configured, for example as a rod or helical coil, according to design choice.

An electrically conductive assembly stud 78, which may be for example a threaded brass bolt, is installed in the distal end of the mounting shaft 22 and serves to connect the various elements of the main rod assembly and hold them securely together during operation of the apparatus 10. A separate assembly nut may be operatively engaged with the assembly stud 78 for security of connection.

Continued reference is made to FIG. 2. The sliding handle assembly includes the handle 40 which is securely connected to a conductive collar 50. (Only the distal end portion of the handle is depicted in FIG. 2; see FIG. 1 for a fuller view of the proximal portions of the handle 40.) As mentioned, the handle is hollow, having an inside diameter to accommodate the smooth insertion of the main rod 20 therein. At its distal end the handle 40 has a flange 44 integrally formed therewith, or reliably attached thereto. The flare or flange 44 allows for the secure fastening, as with screws, rivets, adhesives or the like (fasteners not shown) of the proximal end of the collar 50 to the distal end of the handle 40. A conductive collar mounting washer 48, composed of brass or the like, is disposed (also by fastening means not depicted in the drawing) between the handle flange 44 and the proximal end of the collar 50, in electrical contact with the collar 50. The collar mounting washer 48 defines an aperture 46 preferably of sufficient diameter to permit the passage of the first mounting washer 30 there-through, i.e., the outside diameter of the first mounting washer 30 is somewhat less than the inside diameter of the collar mounting washer 48.

The rigid collar 50 is electrically conductive, and may be made of brass for example. In one preferred embodiment and as seen in the drawing figures, the collar 50 is a hollow tube-like cylinder. The distal end of the cylinder may have a flange directed radially inward, upon which are situated one or more travelling contacts 52, 53, as indicated in FIG. 2.

In acceptable alternative embodiments, the collar 50 instead of a cylinder may be two or more rigid, conductive, metal bars or rods. Such an alternative embodiment is seen in FIG. 2A, where the collar 50 has rods 35, 36 extending perpendicularly and distally forward from the flange 44. The collar rods 35, 36 preferably are circumferentially equi-spaced and mutually parallel.

In all embodiments, the collar 50 has an inside diameter adequate to permit the resistor to be disposed coaxially therein, with a significant annular space between them. The outside diameter of the collar 50 is substantially less than the inside diameter of the debris barrier. Connected to the distal end of the collar 50 are two or more electrical contacts 52, 53, to be further described hereafter.

Figure 3:
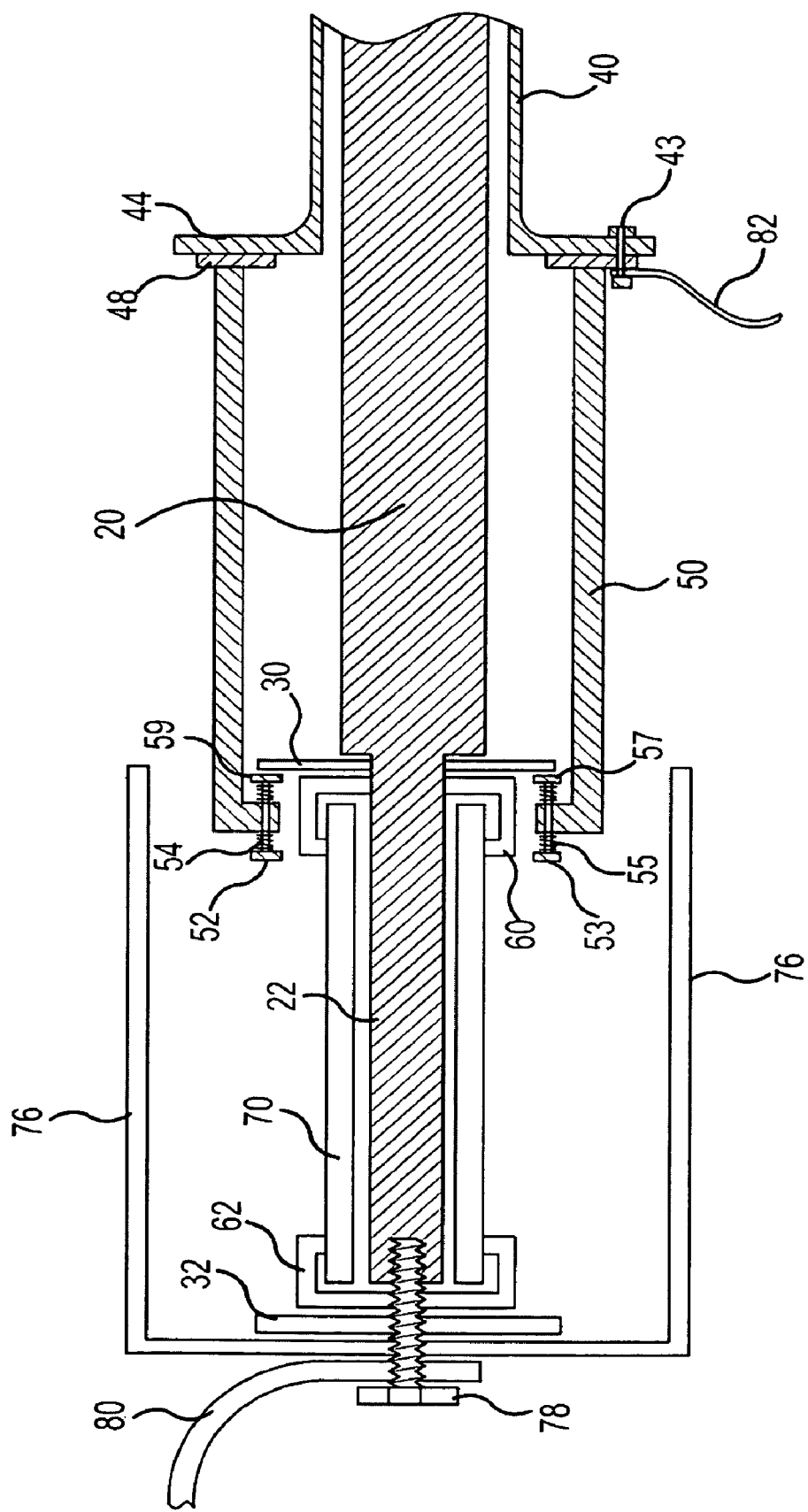
FIG. 3 is an enlarged side sectional view of a portion of the apparatus depicted in FIG. 1, being that portion circumscribed by a dashed line in FIG. 1, showing the handle assembly in a first position.

The various components of the main rod handle assembly are interconnected in a generally coaxial manner as suggested by FIG. 2. Combined reference to FIGS. 2 and 3 illustrate how the main rod assembly is assembled by slipping the first mounting washer 30 over the mounting shaft 22, and sliding it into abutment against the main rod 20. The first resistor mounting clamp 60 is securely installed upon the proximate end of the resistor 70, and the second resistor mounting clamp 62 is installed upon the distal end of the resistor 70. This resistor-clamps subassembly is then installed upon the mounting shaft 22 by passing the shaft 22 through the aperture 31 in the first mounting washer 30, and inserting the shaft 22 through the central aperture of the first clamp 60, along the axial bore of the resistor 70 and to the end of the second resistor mounting clamp 62. The second mounting washer 32 is placed in contact flush against the outside or distal end of the second resistor clamp 62, with its central aperture aligned with the central aperture of the second resistor clamp and with the bore of the resistor 70; the distal end of the mounting shaft 22 is just inside the distal end of the second clamp 62.

The resistor 70 and clamps 60, 62, as disposed upon the mounting shaft 22 are then inserted into the interior space within the debris shield 76. The debris shield 76 has a back wall 26 with a centrally defined mounting hole 28 there-through. The second mounting washer 32 is abutted against the inside back wall 26 of the debris shield 76, as seen in FIG. 3, with the apertures in the second clamp 62 and washer 32 aligned with the hole 28 in the debris shield's back wall 26. A mounting hole through the equipment contact member 80 is registered with the hole in the back wall 26. The assembly stud 78 is inserted through all the coaxially aligned apertures in the contact member 80, barrier 76, second mounting washer 32, and second resistor clamp 62. The stud 78 is turned (as by screwed engagement) or otherwise or forced or installed into the distal end of the mounting shaft 22, thereby to securely pin or screw together the shaft 22, clamp 62, washer 32 barrier 76 and contact member 80 as seen in FIG. 3. The threaded or forced connection between the mounting stud 78 and the mounting shaft also compressibly secures the resistor 70 upon the shaft 22 (but in spaced-apart ration from them by the function of the clamps 60, 62), also as indicated in FIG. 3.

Attached to the handle flange 44, in electrical connection with the collar 50 via a fastener 43 (e.g., nut-and-bolt, screw, or the like) and the collar mounting washer 48, is a grounding cord or strap 82. The strap 82 may be, for example, braided wire. The strap 48 is insulated, and serves during operation of the apparatus to direct electricity from the apparatus 10 to absolute ground. Thus, during operation of the apparatus the distal end of the strap preferably is connected to a suitable ground, such as a safely grounded building frame element or the like.

The sliding handle assembly is constructed by sandwiching the collar mounting washer 48 between the handle flange 44 and the collar 50. The connections between the collar 50, washer 48 and the flange 44 of the handle 40 may be by any reliable means (fasteners not shown in drawing figures) such as screws or rivets.

Figure 4:
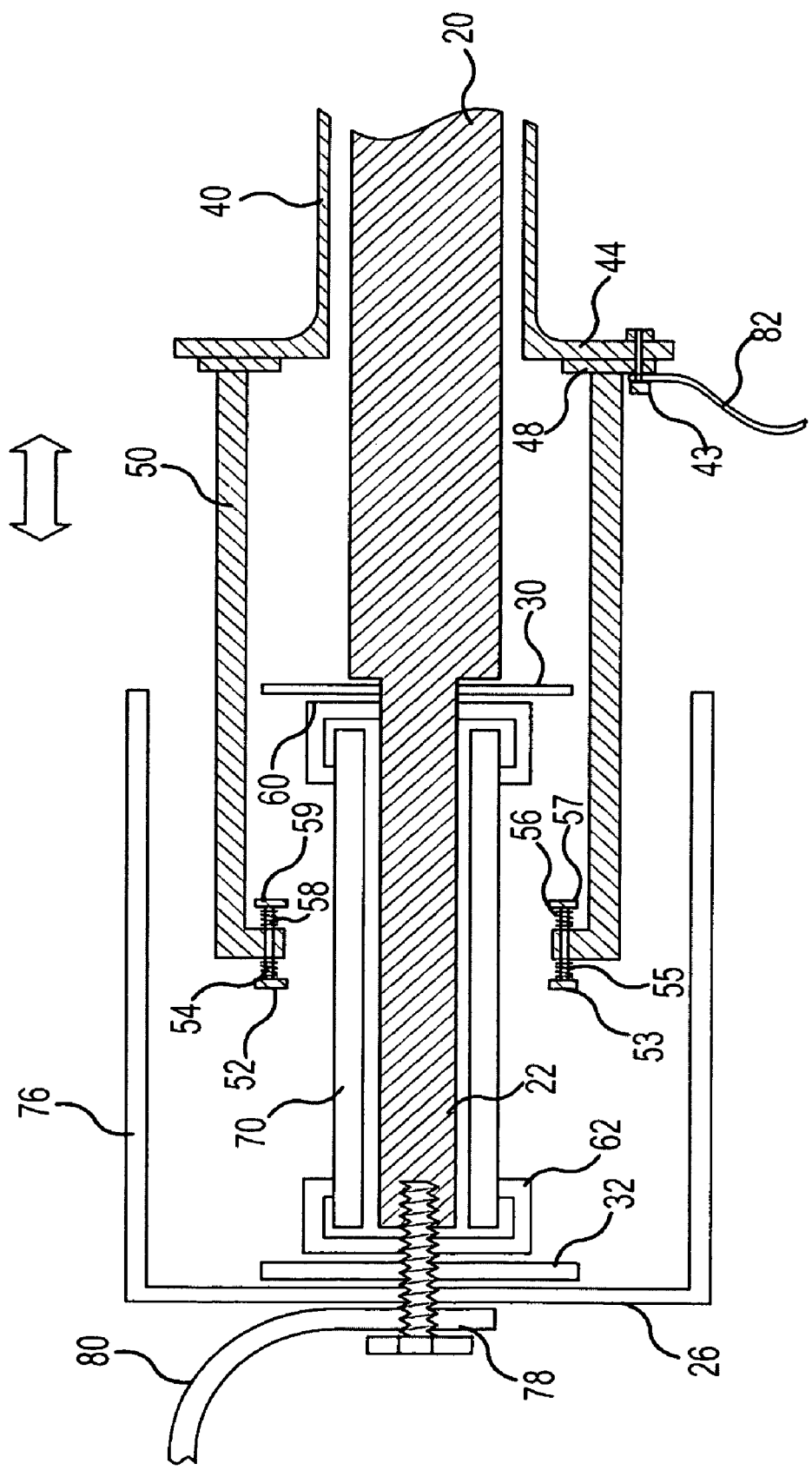
FIG. 4 is similar to FIG. 3, except that the handle assembly is shown in an intermediate position relative to the main rod assembly.
Figure 5:
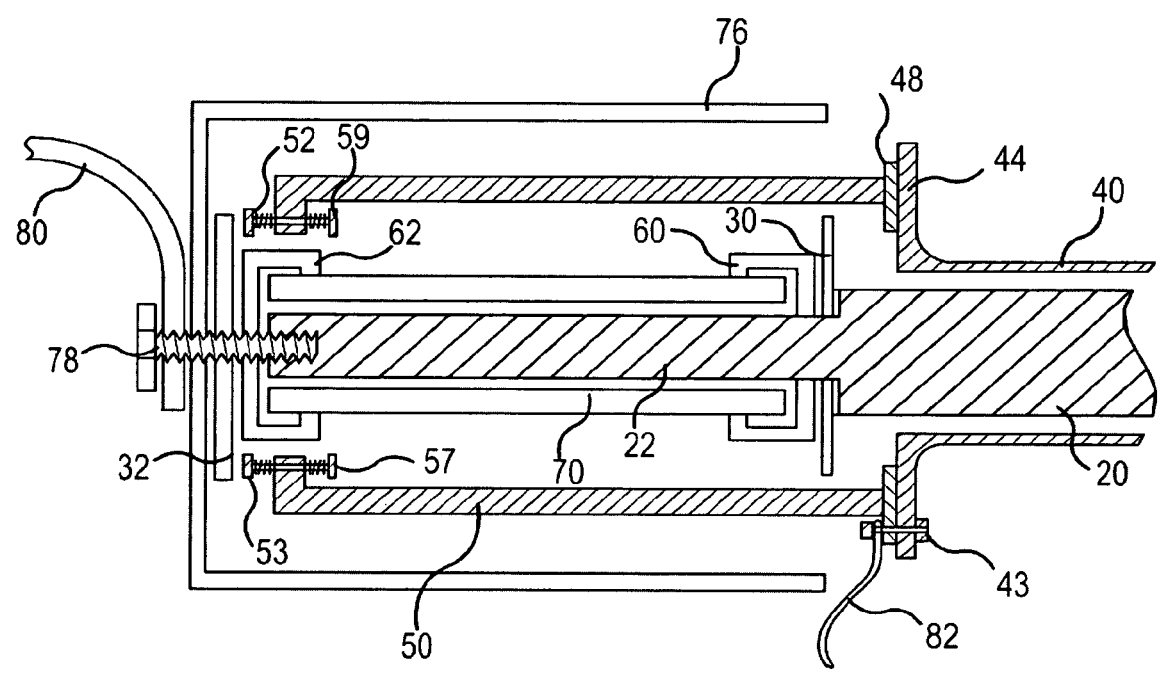
FIG. 5 is similar to FIG. 3, except that the handle assembly is shown in a second position relative to the main rod assembly.

Combined reference is made to FIGS. 3-5 showing side (axial) sectional enlarged views of the distal end (circled by a phantom line in FIG. 1) of the apparatus 10. As suggested by the double-ended directional arrow in FIG. 4, the handle assembly is movable axially in relation to the main rod assembly, particularly the rod 20 an mounting shaft, by application of a controlled (e.g. manual) force applied by the user to the handle 40. The handle assembly can reciprocate to and fro between the first position seen in FIG. 3 and the second position shown in FIG. 5. FIG. 4 is a neutral intermediate position.

FIGS. 3-5 show that the distal end of the handle assembly, specifically the distal end of the collar 50, is provided with at least one, preferably at least two, or more traveling contacts 52, 53. Traveling contacts 52, 53 are conductive elements configured to provide reliable electrical contact between the handle assembly and the main rod assembly. During the operation of the apparatus 10, the contacts 52, 53 come into controlled physical and electrical contact with the conductive mounting washers 30, 32, thus regulating the flow of electrical current through elements of the apparatus, most especially the resistor 70. As indicated in FIGS. 3-5, the traveling contacts 52, 53 may be situated upon a radially inwardly directed flange of the collar 50. If more than one traveling contact are provided in the apparatus, they preferably but not necessarily are located at uniformly equal spacing, relative to each other, about the circumference of the collar.

The traveling contacts 52, 53 are dual-sided, in the sense that an electrical contact surface is provided in either axial direction (proximally and distally) of the apparatus. Thus, each traveling contact 52, 53 has a first proximal contact surface 57, 59 that is contactable with the first mounting washer 30, while the second or distal surfaces 52, 53 are contactable with the second mounting washer 32.

In one preferred embodiment, the dual-sided traveling contacts 52, 53 are "floating," i.e., they are slidably disposed for limited axial movement in relation to the collar 50. For example, each traveling contact 52, 53 may be movable within corresponding axial apertures through the distal flange of the collar 50 is suggested by the drawing figures. Each contact has a stem portion slidably engaged to the collar, with contact surfaces 52, 59 and 53, 57 on opposite ends of each respective stem. The traveling contacts 52, 53 have constant electrical connection with the collar 50. Bumper biasing means, such as cushioning springs 54, 58 and 55, 56, optionally may be disposed on the floating contacts, for example around respective stems of the contacts 52, 53. The bumper cushioning springs 54, 55, 56, 58, serve to cushion the collision between the traveling contacts and the mounting washers 30, 32 as they come into contact initially, and also serve to urge the traveling contacts toward the mounting washers 30, 32 after they have come into contact, thereby to promote continued reliable electrical contact between the contacts 52, 53 and an appropriate one of the washers 30, 32.

To begin the operation of the apparatus, the user grips the handle 40 and slides it toward himself until the traveling contacts 52, 53 come into physical and electrical contact with the first mounting washer 30, as seen in the first position shown in FIG. 3 where the contact surfaces 57, 59 are pressed against the first mounting washer. Any of a number of suitable known locking means (not shown in the drawings, but being for example, a twist-lock engagement) may then be actuated to releasably hold the sliding handle assembly in the first position relative to the rod assembly seen in FIG. 3. In this first position, the apparatus is in condition for use.

Continuing reference is made to FIG. 3. Holding the apparatus 10 by either or both the main rod 20 and the handle 40, the apparatus is taken to the equipment of interest. The equipment contact member 80 is then touched against the subject equipment. Any electrical energy to be safely discharged from the equipment flows as current through the equipment contact member 80 through the conductive assembly stud 58 and to the second resistor mounting assembly. The current flows through the second mounting washer 32 and the second resistor mounting clamp 62, and through the resistor 70 toward the first resistor mounting assembly. The current flows from the resistor via the first resistor clamp 60 and the first mounting washer 30, and continues through the traveling contacts 52, 53 and the collar 50; the conductive collar mounting washer 48, if used, provides an electrical connection between the collar 50 and the conductive strap fastener 43. From the fastener 43, electrical current exits the apparatus via the strap 82 and passes safely to absolute ground.

Once the foregoing hazardous discharge has completed, but with the equipment contact member 80 yet in maintained electrical contact with the equipment of interest, the operator slides the handle assembly forward (after releasing the locked engagement between them, if needed) from the first position seen in FIG. 3, thus breaking the electrical contact between the travelling contacts 52, 53 and the first mounting washer 30. The handle 40 is pushed forward (i.e., toward the left as seen in FIG. 3) through the intermediate position seen in FIG. 4, and toward the second position depicted in FIG. 5.

The axial movement of the handle assembly is controllably continued till the traveling contacts come into physical, and electrical contact, with the conductive second mounting washer, as shown in FIG. 5. With the handle assembly in this second position, current may flow from the equipment of interest and into the apparatus 10 via the equipment contact member 80. However, with the apparatus in this second position electric current bypasses the resistor; rather, current flows from the equipment contact member 80 directly to the grounding strap 82 via the stud 78, second mounting washer 32, travelling contacts 52, 53 and the collar 50 to the strap fastener or connection 43. The apparatus 10 should be held in this position and in electrical contact with the equipment of interest throughout maintenance or other activities on that equipment. Again, a releasable locking mechanism (not shown) can be provided in the apparatus to hold the handle assembly and the main rod assembly in this second position during operations on the discharged equipment.

Accordingly there has been disclosed a shorting stick apparatus 10 featuring a main rod assembly and a handle assembly movably disposed on the handle assembly. The handle assembly preferably is disposed coaxially around the main rod assembly, and, as explained, is movable axially in relation thereto. The main rod assembly has a rod 20, a resistor 70 mounted between first and second conductive mounting assemblies, at least one of the mounting assemblies being attached to the rod 20 thereby to dispose the resistor 70 upon the rod, and an equipment contact member 80 electrically connected to the second mounting assembly and defining the distal end of the shorting stick apparatus, The handle assembly includes a non-conductive handle 40, a grounding strap 82 on the handle, a conductive collar member 50 extending from the handle, and at least one, preferably two or more, traveling contacts 52 situate upon the collar and electrically connected to the grounding strap. The handle assembly is movable reciprocally between a first position (FIG. 3) with the traveling contact 52 in electrical contact with the first mounting assembly, and a second position (FIG. 5) with the traveling contact out-of-contact with the first mounting assembly and in electrical contact with the second mounting assembly. When the handle assembly is in the first position, electric current may flow from the equipment contact member 80 toward the grounding strap 82 via the resistor 70, but when the handle assembly is in the second position, electric current bypasses the resistor en route from the equipment contact member to the grounding strap.

Each of the conductive mounting assemblies has a resistor mounting means for securely holding the resistor 70, and a conductor means for transmitting electric current to and from the resistor. The resistor mounting means may be an annular clamp 60 or 62, and the means for transmitting may be a mounting washer 30 or 32 in contact with a corresponding annular clamp.

The resistor 70 preferably is a hollow cylinder, and may be crafted from, for example, ceramic compounds. The first conductive mounting assembly (e.g., 30 and 60) is operatively engaged with a first end of the resistor cylinder, and the second conductive mounting assembly (e.g., 32 and 62) is operatively engaged with a second end of the resistor cylinder.

The rod 20 preferably has a mounting shaft portion 22, and the resistor 70 preferably is mounted coaxially around the mounting shaft, spaced radially apart there-from. At least one of the annular clamps 60 secures the resistor 70 upon the mounting shaft 22, and at least one of the mounting washers 30 is disposed coaxially around the mounting shaft as well.

The main rod assembly optionally features a debris shield 76 surrounding a substantial portion of the resistor 70. The debris shield 76 preferably is configured as a hollow cylinder, and the equipment contact member 80 is situated external to the shrapnel debris shield. In the preferred embodiment, the debris shield 76 has a radial extent to enclose all the working elements directly associated with the resistor 70 and its mounting assemblies and means; further, the debris barrier 76 preferably has an axial extent adequate to enclose all the axial extent of the resistor 70 regardless of the position of the handle assembly including the collar 50 (such as the first position shown in FIG. 3).

The collar 50 may be a hollow cylinder extending axially from the handle 40. Alternatively, the collar 50 has at least two rods 35, 36 extending axially from the handle.

A traveling contact 52 preferably is a dual-sided contact floatably disposed on the distal end of the collar 50. The preferred embodiment of the apparatus 10 has at least two traveling contacts 52, 53. Thus, in a shorting stick according to this disclosure, a traveling contact includes at least two dual-sided contacts 52, 53 disposed on the distal end of the collar 50, so that when the handle assembly is moved to the a first position, first sides 57, 59 of the dual-sided contacts are in contact with the first mounting washer 30, and when the handle assembly is moved to the second position, second sides of the dual-sided contacts 52, 53 are in contact with the second mounting washer 32.

The inventive method is apparent from the forgoing, but the basic process for safely discharging electrical energy from an equipment includes the steps of: (a) mounting a resistor 70 between first (30, 60) and second (32, 62) conductive mounting assemblies; (b) disposing the resistor 70 upon a rod 20; (c) electrically connecting an equipment contact member 80 to the second mounting assembly to extend away from the resistor 70; (d) movably disposing a handle assembly on the rod 20, and (e) providing the handle assembly with a traveling contact 52 in electrical connection with a grounding strap 82; (f) placing the traveling contact 52 in electrical connection with the first mounting assembly (30, 60); (g) electrically contacting the contact member 80 with the equipment to allow electric current to flow from the equipment through the resistor 70 and the traveling contact 52 to the grounding strap 82; (h) moving the handle assembly on the rod 20 to disconnect the traveling contact 52 from the first mounting assembly and to connect the traveling contact with the second mounting assembly (32, 62), while maintaining electrical contact between the equipment contact member 80 and the equipment, to allow electric current to bypass the resistor 70 and flow from the equipment to the grounding strap 82.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents.

I claim:

1. A shorting stick comprising:
    a main rod assembly comprising:
        a rod;
        a resistor mounted between first and second conductive mounting assemblies, at least one of the mounting assemblies attached to the rod thereby to dispose the resistor upon the rod; and
        an equipment contact member electrically connected to the second mounting assembly and defining the distal end of the shorting stick; and
    a handle assembly movably disposed on the rod, the handle assembly comprising:
        a non-conductive handle;
        a grounding strap on the handle;
        a conductive collar extending from the handle; and
        a traveling contact situated upon the collar and electrically connected to the grounding strap;
    wherein the handle assembly is movable between a first position with the traveling contact in electrical contact with the first mounting assembly and a second position with the traveling contact out of contact with the first mounting assembly and in electrical contact with the second mounting assembly;
    wherein when the handle assembly is in the first position, electric current may flow from the equipment contact member toward the grounding strap via the resistor; and
    wherein when the handle assembly is in the second position, electric current bypasses the resistor en route from the equipment contact member to the grounding strap.

2. A shorting stick according to claim 1 wherein the handle assembly is disposed coaxially around the main rod assembly and is movable axially in relation thereto.

3. A shorting stick according to claim 1 wherein the resistor comprises a hollow cylinder.

4. A shorting stick according to claim 3 wherein the first conductive mounting assembly is operatively engaged with a first end of the resistor cylinder and the second conductive mounting assembly is operatively engaged with a second end of the resistor cylinder.

5. A shorting stick according to claim 4 wherein each of said conductive mounting assemblies comprises:
    a resistor mounting means for securely holding the resistor; and
    conductor means for transmitting electric current to and from the resistor.

6. A shorting stick according to claim 5 wherein the resistor mounting means comprises an annular clamp, and the means for transmitting comprises a mounting washer in contact with the annular clamp.

7. A shorting stick according to claim 6 wherein the rod further comprises a mounting shaft, and the resistor is mounted coaxially around the mounting shaft, spaced radially apart there-from.

8. A shorting stick according to claim 7 wherein at least one of the annular clamps secures the resistor upon the mounting shaft, and at least one of the mounting washers is disposed coaxially around the mounting shaft.

9. A shorting stick according to claim 1 wherein the main rod assembly further comprises a debris shield surrounding a substantial portion of the resistor.

10. A shorting stick according to claim 9 wherein the debris shield comprises a hollow cylinder, and the equipment contact member is situated external to the debris shield.

11. A shorting stick according to claim 1 wherein the collar comprises a hollow cylinder extending axially from the handle.

12. A shorting stick according to claim 1 wherein the collar comprises at least two rods extending axially from the handle.

13. A shorting stick according to claim 1 wherein the traveling contact comprises a dual-sided contact floatably disposed on the distal end of the collar.

14. A shorting stick according to claim 1 further comprising at least two traveling contacts.

15. A shorting stick according to claim 5 wherein the traveling contact comprises at least two dual-sided contacts disposed on the distal end of the collar; and
    wherein when the handle assembly is moved to the a first position, first sides of the dual-sided contacts are in contact with the first mounting washer, and when the handle assembly is moved to the second position, second sides of the dual-sided contacts are in contact with the second mounting washer.

16. A method for safely discharging electrical energy from an equipment, comprising:

mounting a resistor between first and second conductive mounting assemblies;
disposing the resistor upon a rod;
electrically connecting an equipment contact member to the second mounting assembly to extend away from the resistor;
movably disposing a handle assembly on the rod, and providing the handle assembly with a traveling contact in electrical connection with a grounding strap;
placing the traveling contact in electrical connection with the first mounting assembly;
electrically contacting the contact member with the equipment to allow electric current to flow from the equipment through the resistor and traveling contact to the grounding strap; and
moving the handle assembly on the rod to disconnect the traveling contact from the first mounting assembly and to connect the traveling contact with the second mounting assembly, while maintaining electrical contact between the equipment contact member and the equipment, to allow electric current to bypass the resistor and flow from the equipment to the grounding strap.

17. An apparatus for safely discharging electrical energy from an equipment, comprising:
   a resistor mounted between first and second conductive mounting assemblies;
   a resistor disposed upon a rod;
   an equipment contact member electrically connected to the second mounting assembly and extending distally there from; and
   a handle assembly movably disposed on the rod, the handle assembly comprising a traveling contact in electrical connection with a grounding strap; wherein the handle assembly is movable on the rod between a first position with the traveling contact electrically connected with the first mounting assembly and a second position with the traveling contact disconnected from the first mounting assembly and electrically connected with the second mounting assembly, thereby allowing electric current flowing from the equipment contact member to bypass the resistor en route to the grounding strap.

\* \* \* \* \*